(12) United States Patent
Baek et al.

(10) Patent No.: US 10,805,208 B2
(45) Date of Patent: Oct. 13, 2020

(54) APPARATUS FOR SUPPORTING SETTING OF NETWORK ROUTING PATH AND METHOD FOR THE SAME

(71) Applicant: ELECTRONICS AND TELECOMMUNICATIONS RESEARCH INSTITUTE, Daejeon (KR)

(72) Inventors: Ock-Kee Baek, Daejeon (KR); Wan Choi, Daejeon (KR)

(73) Assignee: ELECTRONICS AND TELECOMMUNCATIONS RESEARCH INSTITUTE, Daejeon (KR)

(*) Notice: Subject to any disclaimer, the term of this patent is extended or adjusted under 35 U.S.C. 154(b) by 17 days.

(21) Appl. No.: 16/215,430

(22) Filed: Dec. 10, 2018

(65) Prior Publication Data

US 2019/0190817 A1    Jun. 20, 2019

(30) Foreign Application Priority Data

Dec. 20, 2017  (KR) .................. 10-2017-0175801
Feb. 9, 2018   (KR) .................. 10-2018-0016191

(51) Int. Cl.
   *H04L 12/707*   (2013.01)
   *H04L 12/24*    (2006.01)
   (Continued)

(52) U.S. Cl.
   CPC .......... *H04L 45/24* (2013.01); *H04L 41/0806* (2013.01); *H04L 45/12* (2013.01);
   (Continued)

(58) Field of Classification Search
   CPC ..... H04L 45/24; H04L 45/12; H04L 41/0806; H04L 12/24; G06F 15/16
   See application file for complete search history.

(56) References Cited

U.S. PATENT DOCUMENTS 6,704,301 B2    3/2004  Chari et al.
10,044,581 B1 *  8/2018  Russell .................. H04L 43/08
                        (Continued)

FOREIGN PATENT DOCUMENTS

KR   100367411 B1   1/2003
KR   100845675 B1   7/2008

OTHER PUBLICATIONS

Justin A. Boyan et al., "Packet Routing in Dynamically Changing Networks: A Reinforcement Learning Approach", NIPS'93 Proceedings of the 6th International Conference on Neural Information Processing Systems, 1993, pp. 671-678.
(Continued)

*Primary Examiner* — Wei Zhao

(57) ABSTRACT

Disclosed herein is an apparatus for supporting setting of a network routing path, which includes a sub-cast list management unit for managing a sub-cast list that contains information about one or more other apparatuses for supporting setting of a network routing path with which the apparatus establishes a network session; a session management unit for simultaneously transmitting a SYNC message to at least some of the apparatuses included in the sub-cast list and establishing a network session with one of the apparatuses included in the sub-cast list in consideration of responses to the SYNC message; and a communication unit for transmitting data via the established network session.

20 Claims, 7 Drawing Sheets

(51) Int. Cl.
*H04L 12/803* (2013.01)
*H04L 12/721* (2013.01)
*H04L 29/06* (2006.01)
*H04L 29/08* (2006.01)

(52) U.S. Cl.
CPC .......... *H04L 47/125* (2013.01); *H04L 67/141* (2013.01); *H04L 69/04* (2013.01)

(56) References Cited

U.S. PATENT DOCUMENTS

2012/0185613 A1* 7/2012 Noldus ............. H04L 29/12066
709/248
2013/0022083 A1* 1/2013 Vasseur ............. H04W 74/0808
375/132

OTHER PUBLICATIONS

Liping Fu, "An adaptive routing algorithm for in-vehicle route guidance systems with real-time information" Transportation Research Part B, 2001, pp. 749-765, Elsevier Science Ltd.
Payman Arabshahi et al., "Adaptive Routing in Wireless Communication Networks using Swarm Intelligence", AIAA 19th Annual Satellite Communications System Conference, Toulouse, France, 2001, pp. 1-9.
Samuel P.M. Choi et al., "Predictive Q-Routing: A Memory-based Reinforcement Learning Approach to Adaptive Traffic Control", Advances in Neural Information Processing Systems 8, 1996, pp. 945-951.

* cited by examiner

APPARATUS FOR SUPPORTING SETTING OF NETWORK ROUTING PATH AND METHOD FOR THE SAME

CROSS REFERENCE TO RELATED APPLICATIONS

This application claims the benefit of Korean Patent Application No. 10-2017-0175801, filed Dec. 20, 2017, and No. 10-2018-0016191, filed Feb. 9, 2018, which are hereby incorporated by reference in their entirety into this application.

BACKGROUND OF THE INVENTION

1. Technical Field

The present invention relates generally to an apparatus and method for supporting setting of a network routing path, and more particularly to an apparatus and method for supporting the process of dynamically setting an optimal network routing path in consideration of the load of intermediate systems.

2. Description of the Related Art

These days, various types of sensors, actuators, mobile devices, intelligent electronic devices, transportation means, satellites, and the like are connected with each other and transmit and receive a large amount and various types of data in real time at high speed. Here, a network in which a source system for transmitting data is included may differ from the network in which a destination system for receiving the data is included, and the respective networks may use different network protocols and different network media. For example, the destination system may be connected with an optical fiber backbone network, but the source system may be connected with a Wi-Fi network.

Generally, data is exchanged at high speed over a network. Accordingly, data is exchanged in real time in many cases. Particularly, because some time-sensitive data must be transmitted within a very short interval, it is necessary to transmit the data at high speed using the shortest path from a source system to a destination system.

Generally, the time taken to transmit a packet from a source system to a destination system depends on the sum of the travel time of the packet and the time during which the packet is queued in intermediate systems. Accordingly, in order to reduce transmission time, it is necessary to consider the load of intermediate systems and the network load between the intermediate systems.

However, a conventional packet-routing algorithm considers only the number of hops between a source system and a destination system and bandwidth information without consideration of intermediate systems or the network load therebetween. Also, the conventional packet-routing algorithm does not consider the content of the data to be transmitted or information about whether the data is time-sensitive.

The above-described information about the related art has been retained by the inventors for the purpose of developing the present invention or was obtained during the process of developing the present invention. Also, it should be appreciated that this information did not necessarily belong to the public domain before the patent filing date of the present invention. In connection with this, Korean Patent No. 10-0845675 discloses a technology related to "Method for configuring routing path in a wireless ad-hoc network".

SUMMARY OF THE INVENTION

An object of the present invention is to provide an apparatus and method for supporting setting of a network routing path in consideration of the load of intermediate systems and the network load between the intermediate systems.

Another object of the present invention is to provide an apparatus and method for supporting setting of a network routing path that is optimized for a given situation by dynamically managing a sub-cast list in consideration of responses from intermediate systems when a network session is established.

A further object of the present invention is to provide an apparatus and method for supporting setting a network routing path in which data is distributed across multiple networks that form a network session in consideration of the characteristics of the data to be transmitted.

An embodiment of the present invention provides an apparatus for supporting setting of a network routing path, the apparatus including a sub-cast list management unit for managing a sub-cast list, which includes one or more other apparatuses for supporting setting of a network routing path with which a network session is to be established and information about the apparatuses; a session management unit for simultaneously transmitting a SYNC message to at least some of the apparatuses included in the sub-cast list and establishing a network session with one of the apparatuses included in the sub-cast list in consideration of responses to the SYNC message; and a communication unit for transmitting data in the established network session.

Here, the sub-cast list management unit may dynamically manage the sub-cast list by reflecting the responses to the SYNC message.

Here, the sub-cast list management unit may raise the score or priority of the apparatus included in the sub-cast list when the response by the apparatus to the SYNC message is faster.

Here, the sub-cast list may include a time factor or a place factor for each of the apparatuses included in the sub-cast list, and the session management unit may calculate a temporary score or temporary priority to which the time factor or the place factor, corresponding to a situation in which the SYNC message is transmitted, is reflected, and may select apparatuses to which the SYNC message is to be transmitted depending on the temporary score or the temporary priority.

Here, the sub-cast list management unit may adjust the time factor or the place factor in consideration of the responses to the SYNC message and the situation in which the SYNC message is transmitted.

Here, the apparatus may further include a transmission mode management unit for determining a transmission mode for the data in consideration of the characteristics of the data, and when the transmission mode is a time-sensitive transmission mode, the session management unit may simultaneously transmit the SYNC message to all of the apparatuses included in the sub-cast list and establish a network session with an apparatus that responds to the SYNC message first.

Here, when the transmission mode is not a time-sensitive transmission mode, the session management unit may establish a network session with a first apparatus, among the apparatuses included in the sub-cast list.

Here, the first apparatus may be an apparatus having the highest score or highest priority in a current situation, among the apparatuses included in the sub-cast list.

Here, when the network session is connected through multiple networks, the communication unit may distribute the data across the multiple networks or transmit the data over a network selected from among the multiple networks in consideration of at least one of the time-sensitivity of the data, the size thereof, and the importance thereof.

Here, the apparatus may further include a data management unit for performing at least one of compression of the data, encryption of the data, and digital signing of the data.

Another embodiment of the present invention provides a method for supporting setting of a network routing path, the method including managing a sub-cast list, which includes one or more apparatuses for supporting setting of a network routing path with which a network session is to be established and information about the apparatuses; simultaneously transmitting a SYNC message to at least some of the apparatuses included in the sub-cast list; establishing a network session with one of the apparatuses included in the sub-cast list in consideration of responses to the SYNC message; and transmitting data in the established network session.

Here, managing the sub-cast list may be configured to dynamically manage the sub-cast list by reflecting the responses to the SYNC message.

Here, managing the sub-cast list may be configured to raise the score or priority of the apparatus included in the sub-cast list when the response by the apparatus to the SYNC message is faster.

Here, the sub-cast list includes a time factor or a place factor for each of the apparatuses included in the sub-cast list, and transmitting the SYNC message may be configured to calculate a temporary score or temporary priority to which the time factor or the place factor, corresponding to a situation in which the SYNC message is transmitted, is reflected and to select apparatuses to which the SYNC message is to be transmitted depending on the temporary score or the temporary priority.

Here, managing the sub-cast list may be configured to adjust the time factor or the place factor in consideration of the responses to the SYNC message and the situation in which the SYNC message is transmitted.

Here, the method may further include determining a transmission mode for the data in consideration of the characteristics of the data, and establishing the network session may be configured such that, when the transmission mode is a time-sensitive transmission mode, the SYNC message is simultaneously transmitted to all of the apparatuses included in the sub-cast list and the network session is established with an apparatus that responds to the SYNC message first.

Here, establishing the network session may be configured to establish the network session with a first apparatus, among the apparatuses included in the sub-cast list, when the transmission mode is not a time-sensitive transmission mode.

Here, the first apparatus may be an apparatus having the highest score or highest priority in a current situation, among the apparatuses included in the sub-cast list.

Here, transmitting the data may be configured such that, when the network session is connected through multiple networks, the data is distributed across the multiple networks or the data is transmitted over a network selected from among the multiple networks in consideration of at least one of the time-sensitivity of the data, the size thereof, and the importance thereof.

Here, the method may further include performing at least one of compression of the data, encryption of the data, and digital signing of the data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
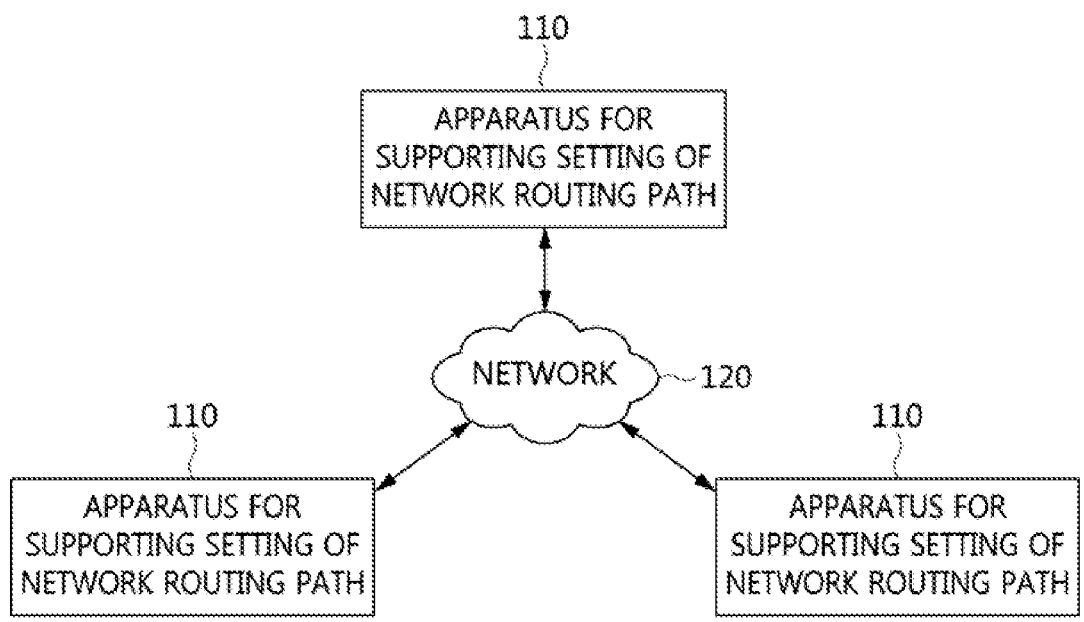
FIG. 1 is a view that shows the configuration of a system for supporting setting of a network routing path according to an embodiment of the present invention.

Because the present invention may be variously changed and may have various embodiments, specific embodiments will be described in detail below with reference to the attached drawings. The effects and features of the present invention and methods of achieving them will be apparent from the following exemplary embodiments, which will be described in more detail with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

However, the present invention is not limited to the embodiments to be described below, and all or some of the embodiments may be selectively combined and configured, and thus the embodiments may be modified in various ways. It will be understood that, although the terms "first", "second", etc. may be used herein to describe various elements, these elements are not intended to be limited by these terms. These terms are only used to distinguish one element from another element. Also, a singular expression includes a plural expression unless a description to the contrary is specifically pointed out in context. Also, it should be understood that terms such as "include" or "have" are merely intended to indicate that features, components, parts, or combinations thereof are present, and are not intended to exclude the possibility that one or more other features, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that shows the configuration of a system 100 for supporting setting of a network routing path according to an embodiment of the present invention.

Referring to FIG. 1, in the system 100 for supporting setting of a network routing path according to an embodiment of the present invention, one or more apparatuses 110 for supporting setting of a network routing path are connected with each other via a network 120.

Here, the apparatus 110 for supporting setting of a network routing path that operates as a source apparatus, from which data is to be transmitted, may be referred to as a source system, an origin system, a source node, an origin node, a source device, an origin device, or the like. Also, the apparatus 110 for supporting setting of a network routing path that operates as a destination apparatus, at which data is to arrive, may be referred to as a destination system, an arrival system, a destination node, an arrival node, a destination device, an arrival device, or the like. Also, an apparatus 110 for supporting setting of a network routing path that is neither the source nor the destination of data transmission may be referred to as an intermediate system, an intermediate node, an intermediate device, or the like.

The apparatus 110 for supporting setting of a network routing path according to an embodiment of the present invention decides on the data to transmit, simultaneously transmits a SYNC message to one or more of apparatuses included in a sub-cast list in order to set a network routing path, establishes a network session with one of the apparatuses in consideration of responses to the SYNC message, and transmits the data in the established network session.

Here, the data to transmit may be data received from another apparatus or data that the current apparatus intends to transmit. That is, when it transmits data received from another apparatus, the apparatus 110 for supporting setting of a network routing path operates as an intermediate apparatus. When it transmits data that is not received from another apparatus, the apparatus 110 for supporting setting of a network routing path operates as a source apparatus.

Here, the sub-cast list contains information about additional apparatuses 110 for supporting setting of a network routing path in the vicinity of the current apparatus 110 for supporting setting of a network routing path, and the score or priority of each of the additional apparatuses 110 may be included in the sub-cast list. Particularly, the respective apparatuses 110 for supporting setting of a network routing path may store and manage their individual sub-cast lists.

Here, the score or priority of each of the apparatuses included in the sub-cast list may be used to select the apparatuses to which a SYNC message is to be transmitted. For example, a SYNC message may be transmitted to all of the apparatuses included in the sub-cast list, but may be transmitted to some of the apparatuses depending on the circumstances, in which case the SYNC message may be transmitted to apparatuses of which the score or priority satisfies certain conditions, among the apparatuses included in the sub-cast list.

Here, the sub-cast list is dynamically managed, and information about the apparatuses included in the sub-cast list may be dynamically modified in consideration of responses to a SYNC message. For example, the faster the apparatus responds to a SYNC message, the higher the grade or priority that the apparatus gains.

Here, the sub-cast list may include factors pertaining to time information (for example, the time of day or the day of the week) and place information (for example, a point of departure and a point of arrival) corresponding to a SYNC message. Using the factors, a different score or different priority may be assigned to each of the apparatuses included in the sub-cast list depending on the situation.

Here, the process in which an apparatus 110 for supporting setting of a network routing path simultaneously transmits a SYNC message to one or more of apparatuses included in a sub-cast list may be performed using a sub-casting mechanism of the Internet protocol or the mechanism of another protocol corresponding thereto. That is, rather than using a unicasting mechanism, in which the processes of unicasting a SYNC message to a single system and checking whether a session is established therewith are repeated, the SYNC message is simultaneously transmitted to multiple systems, whereby the time taken to establish a network session may be reduced.

When a destination apparatus is included in the sub-cast list, a network session is established with the destination apparatus by directly transmitting a SYNC message thereto, and data may be transmitted in the established network session.

In a TCP/IP protocol network, an apparatus that requests to establish a network session transmits a SYNC message to another apparatus, and the apparatus that receives the SYNC message responds thereto with a SYNC+ACK message. When the apparatus that requested to establish a network session receives the SYNC+ACK message, the apparatus transmits an ACK message to the apparatus that transmitted the SYNC+ACK message, thereby establishing a network session with the corresponding apparatus. If the apparatus that requested to establish a network session does not want to establish a network session with the apparatus from which the SYNC+ACK message is received, the apparatus may decline to establish a network session with the corresponding apparatus by transmitting a NACK message thereto. That is, a SYNC message is simultaneously transmitted to multiple apparatuses included in the sub-cast list, but a network session is established with only one of the multiple apparatuses. Therefore, an ACK message is transmitted only to the single apparatus with which a network session is to be established, and a NACK message may be transmitted to the remaining apparatuses, whereby a network session is established with the single apparatus.

Here, the apparatus 110 for supporting setting of a network routing path may establish a network session with the apparatus that responds to a SYNC message first. Here, the routing path to the first responding apparatus may be assumed to be the routing path having the highest Committed Information Rate (CIR), and the apparatus may be assumed to be an apparatus having the greatest number of available system resources at the corresponding time. Accordingly, the process of establishing a network session with the apparatus that responds to a SYNC message first is repeated until arrival at the destination apparatus, whereby the time during which data is queued in the intermediate apparatuses on the network routing path may be minimized, and the shortest path, through which transmission time may be minimized, may be set.

Here, the apparatus 110 for supporting setting of a network routing path may compress the data to transmit depending on the content thereof, may encrypt the data depending on whether security thereof is required, and may digitally sign the data depending on whether non-repudiation of the data is required.

Here, when a network session is established through multiple networks, the apparatus 110 for supporting setting of a network routing path may distribute data across the multiple networks or transmit the data over a network selected from among the multiple networks in consideration of at least one of the size of the data, the time sensitivity of the data, and the importance of the data. That is, the apparatus 110 for supporting setting of a network routing path may efficiently transmit data through network segmentation. For example, time-sensitive data may be transmitted over a high-speed backbone network (for example, a 10/100 Gbps optical fiber network), system management notification or a large amount of data may be transmitted over a medium-speed network (for example, a 100/1000 Mbps LAN), and administrative data may be transmitted over a low-speed network (for example, a 10 Mbps WAN).

The network 120 is a communication network that is a medium via which data is transmitted and received between apparatuses.

Here, the network 120 includes a wireless network and a wired network, and includes a high-speed backbone network, an optical LAN, a modem network, and the like.

A conventional packet-routing algorithm considers only a routing path without consideration of network latency or the semantic characteristics of data. However, in the present invention, an optimal routing path is set in consideration of the load of intermediate systems and the network load between the intermediate systems at the time of setting the routing path, and the routing path is dynamically managed, whereby high performance may be realized. Also, whether to perform additional processing is determined depending on the content of the data to be transmitted, information about whether the data is time-sensitive, information about whether security of the data is required, information about whether non-repudiation of the data is required, and the like. Therefore, data transmission efficiency may be improved. Also, data transmission optimized for the characteristics of data may be realized through network segmentation.

Figure 2:
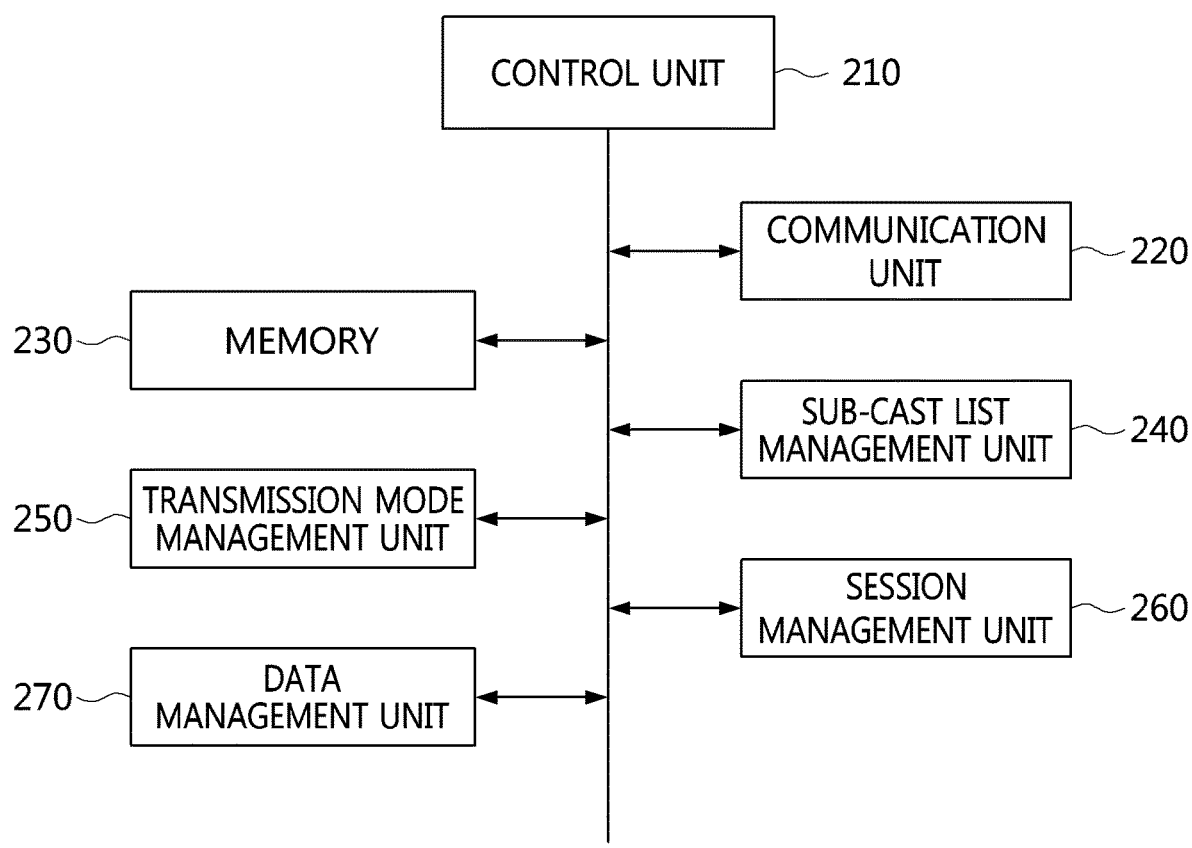
FIG. 2 is a block diagram that shows an example of the apparatus for supporting setting of a network routing path illustrated in FIG. 1.

FIG. 2 is a block diagram that shows an example of the apparatus 110 for supporting setting of a network routing path illustrated in FIG. 1.

Referring to FIG. 2, the apparatus 110 for supporting setting of a network routing path according to an embodiment of the present invention includes a control unit 210, a communication unit 220, memory 230, a sub-cast list management unit 240, a transmission mode management unit 250, a session management unit 260, a data management unit 270, and the like.

Specifically, the control unit 210 is a kind of central processing unit, and controls the overall process of supporting setting of a network routing path. That is, the control unit 210 may provide various functions by controlling the sub-cast list management unit 240, the transmission mode management unit 250, the session management unit 260, the data management unit 270, and the like.

Here, the control unit 210 may include all kinds of devices capable of processing data, such as a processor or the like. Here, the term 'processor' may indicate, for example, a data-processing device embedded in hardware, which has a circuit physically structured for performing functions represented as code or instructions included in a program.

Examples of such a data-processing device embedded in hardware may include processing devices such as a microprocessor, a central processing unit (CPU), a processor core, a multiprocessor, an application-specific integrated circuit (ASIC), a field-programmable gate array (FPGA), and the like, but the present invention is not limited thereto.

The communication unit 220 provides a communication interface that is necessary to send and receive signals to and from other apparatuses (110 in FIG. 1) for supporting setting of a network routing path over a network (120 in FIG. 1).

Here, the communication unit 220 may be a device including hardware and software that are necessary in order to send and receive signals, such as control signals or data signals, to and from another network device through wired or wireless connection therewith.

Here, the communication unit 220 may transmit a SYNC message to other apparatuses (110 in FIG. 1) for supporting setting of a network routing path, receive SYNC+ACK messages therefrom, and transmit an ACK message or a NACK message thereto in response to the SYNC+ACK messages.

Here, the communication unit 220 may transmit data in the established network session.

Here, when the network session established with other apparatuses (110 in FIG. 1) for supporting setting of a network routing path is connected through multiple networks, the communication unit 220 may distribute data across the multiple networks or transmit the data over a network selected from among the multiple networks in consideration of at least one of the time-sensitivity of the data to transmit, the size thereof, and the importance thereof.

The memory 230 functions to temporarily or permanently store data processed by the control unit 210. Here, the memory 230 may include magnetic storage media or flash storage media, but the present invention is not limited thereto.

The sub-cast list management unit 240 manages a sub-cast list that includes information about other apparatuses (110 in FIG. 1), with which a network session is to be established. Here, the sub-cast list includes information about target apparatuses to which a SYNC message is to be transmitted in order to establish a network session. Here, the target apparatuses may be apparatuses for supporting setting of a network routing path included in the sub-cast list.

Here, the sub-cast list may be stored and managed in the storage included in the sub-cast list management unit 240, or may be stored and managed in the memory 230.

Here, the sub-cast list management unit 240 may dynamically manage the sub-cast list in the process of establishing a network session.

Here, information about the apparatuses included in the sub-cast list may include the score or priority of each of the apparatuses.

Here, the sub-cast list management unit 240 may dynamically manage information about the apparatuses included in the sub-cast list in consideration of SYNC+ACK messages transmitted by the respective apparatuses in response to a SYNC message.

Here, the sub-cast list management unit 240 may raise the score or priority of an apparatus when the apparatus responds with a SYNC+ACK message more quickly.

Here, the sub-cast list may include factors pertaining to time information (for example, the time of day or the day of the week) and place information (for example, a point of departure and a point of arrival) corresponding to the current SYNC message, and the sub-cast list management unit 240 may calculate the score or priority of each of the apparatuses included in the sub-cast list in consideration of the time factor or the place factor. For example, when an apparatus included in the sub-cast list responds to a SYNC message faster on weekends than on weekdays, the score or priority for weekdays may be set lower than the score or priority for weekends. Here, the time factors related to the day of the week may include factors for the respective days of the week, factors for weekdays and weekends, and the like, and the time factors related to the time of day may include factors for AM/PM, factors for commuting hours, working hours, and non-working hours, and the like. The place factors may include a factor for a country corresponding to a source or a destination, a factor for a region, and the like.

Here, the time factor or the place factor may be used as a coefficient by which the default score or priority of an apparatus included in the sub-cast list is multiplied or a weight to be applied to the default score or priority thereof. For example, when the default score of an apparatus included in the sub-cast list is 1000 and when the time factors thereof for weekends and weekdays are 0.5 and 1.1, respectively, the score of the apparatus for weekends may be calculated to be 500, and the score of the apparatus for weekdays may be calculated to be 1100.

Here, the time factor or the place factor may be adjusted in consideration of a network session establishment process in the situation corresponding to the factor. For example, assume that the time factors of a certain apparatus are 0.5 and 1.1 for weekends and weekdays, respectively. Here, when a network session is established, if the speed at which the apparatus responds to a SYNC message increases on weekends but decreases on weekdays, the time factor for weekends may be raised to 1.2, and the time factor for weekdays may be lowered to 0.8.

Here, the time factor or the place factor may be adjusted by comparing the time taken for the corresponding apparatus to respond to a SYNC message with the time taken for another apparatus included in the sub-cast list to respond to the SYNC message.

The transmission mode management unit 250 determines a transmission mode for the data to be transmitted in consideration of the characteristics of the data.

Here, the transmission mode may or may not be set to a time-sensitive transmission mode, but the present invention is not limited to this.

Here, when the data to be transmitted is urgent data, the transmission mode management unit 250 may set the transmission mode for the data to a time-sensitive transmission mode. For example, when it is necessary to transmit the sensor data of an Intelligent Electronic Device (IED) in a smart grid, the transmission mode may be set to a time-sensitive transmission mode, but there is no need to set the transmission mode to a time-sensitive transmission mode when data such as e-mail or the like is transmitted.

Here, when the transmission mode is a time-sensitive transmission mode, a SYNC message is simultaneously transmitted to all of the apparatuses included in the sub-cast list, a network session is established with the apparatus that responds thereto first, the path to the first responding apparatus is set as the optimal routing path in the current situation, and data is transmitted along the path.

Here, when the transmission mode is not a time-sensitive transmission mode, a SYNC message is transmitted only to the single apparatus that has the highest score or priority among the apparatuses included in the sub-cast list, a network session is established with the apparatus, and data is transmitted in the established network session.

The session management unit 260 establishes a network session with other apparatuses (110 in FIG. 1) for supporting setting of a network routing path in order to set a network routing path.

Here, the session management unit 260 may simultaneously transmit a SYNC message to at least some of the apparatuses included in the sub-cast list, and may establish a network session with one of the apparatuses in consideration of responses to the SYNC message.

Here, the session management unit 260 may establish a network session with the apparatus that responds to the SYNC message first.

Here, the session management unit 260 may transmit a SYNC message only to apparatuses of which the score or priority satisfies preset conditions, among the apparatuses included in the sub-cast list. For example, the session management unit 260 may transmit a SYNC message only to the top five apparatuses having the highest score or the highest priority or only to the apparatuses of which the score or priority is higher than a preset reference.

Here, the session management unit 260 calculates a temporary score and temporary priority of each of the apparatuses included in the sub-cast list by reflecting a time factor or a place factor, corresponding to the situation in which a SYNC message is transmitted, to the score or priority of the apparatus, and transmits the SYNC message only to the apparatuses of which the temporary score or the temporary priority satisfies preset conditions, among the apparatuses included in the sub-cast list. For example, assume that a SYNC message is transmitted only to the apparatus having the highest score, among the apparatuses included in the sub-cast list. Here, when the score of apparatus A is 1000 and the time factor thereof corresponding to the current situation is 0.8, and when the score of apparatus B is 900 and the time factor thereof corresponding to the current situation is 1, the temporary score of the apparatus A is calculated to be 800, and the temporary score of the apparatus B is calculated to be 900. Therefore, a SYNC message may be transmitted only to the apparatus B.

Here, when a destination apparatus is included in the sub-cast list, the session management unit 260 may transmit a SYNC message only to the destination apparatus, thereby establishing a network session therewith.

Here, when the transmission mode is a time-sensitive transmission mode, the session management unit 260 may simultaneously transmit a SYNC message to all of the apparatuses included in the sub-cast list and establish a network session with the apparatus that responds thereto first.

Here, when the transmission mode is not a time-sensitive transmission mode, the session management unit 260 may establish a network session with the first apparatus, among the apparatuses included in the sub-cast list. Here the first apparatus may be the apparatus having the highest score or priority in the current situation, among the apparatuses included in the sub-cast list.

The data management unit 270 may preprocess the data to be transmitted depending on the characteristics of the data.

Here, the data management unit 270 may compress the data to be transmitted depending on the content or type thereof.

Here, if the data to be transmitted is a sound source, an image, or video, the data management unit 270 may compress the data through lossy compression. For example, through lossy compression, data may be compressed with a compression ratio of 100:1.

Here, if the data to be transmitted is text or numeric data, the data management unit 270 may compress the data through lossless compression. For example, through lossless compression, data may be compressed with a compression ratio of 3:1.

Here, the data management unit 270 may encrypt the data to be transmitted depending on the security thereof. For example, the data management unit 270 may encrypt the data to be transmitted when the data is data for which high security is required, such as a certificate or the like. Here, a conventional encryption method may be used for encryption, and a symmetric key encryption method or an asymmetric key encryption method, such as RSA or the like, may be used. Particularly, the network (120 in FIG. 1) used in the present invention may be protected through Public Key Infrastructure (PKI), and mutual two-way authentication may be enforced based on the X.509 standard for communication between systems.

Here, the data management unit 270 may digitally sign the data to be transmitted depending on whether non-repudiation of the data is required. For example, a message for which high confidentiality and non-repudiation are required is digitally signed based on the ISO/IEC X.509 standard, and exchange of the corresponding message may be recorded and maintained in a security system log.

Figure 3:
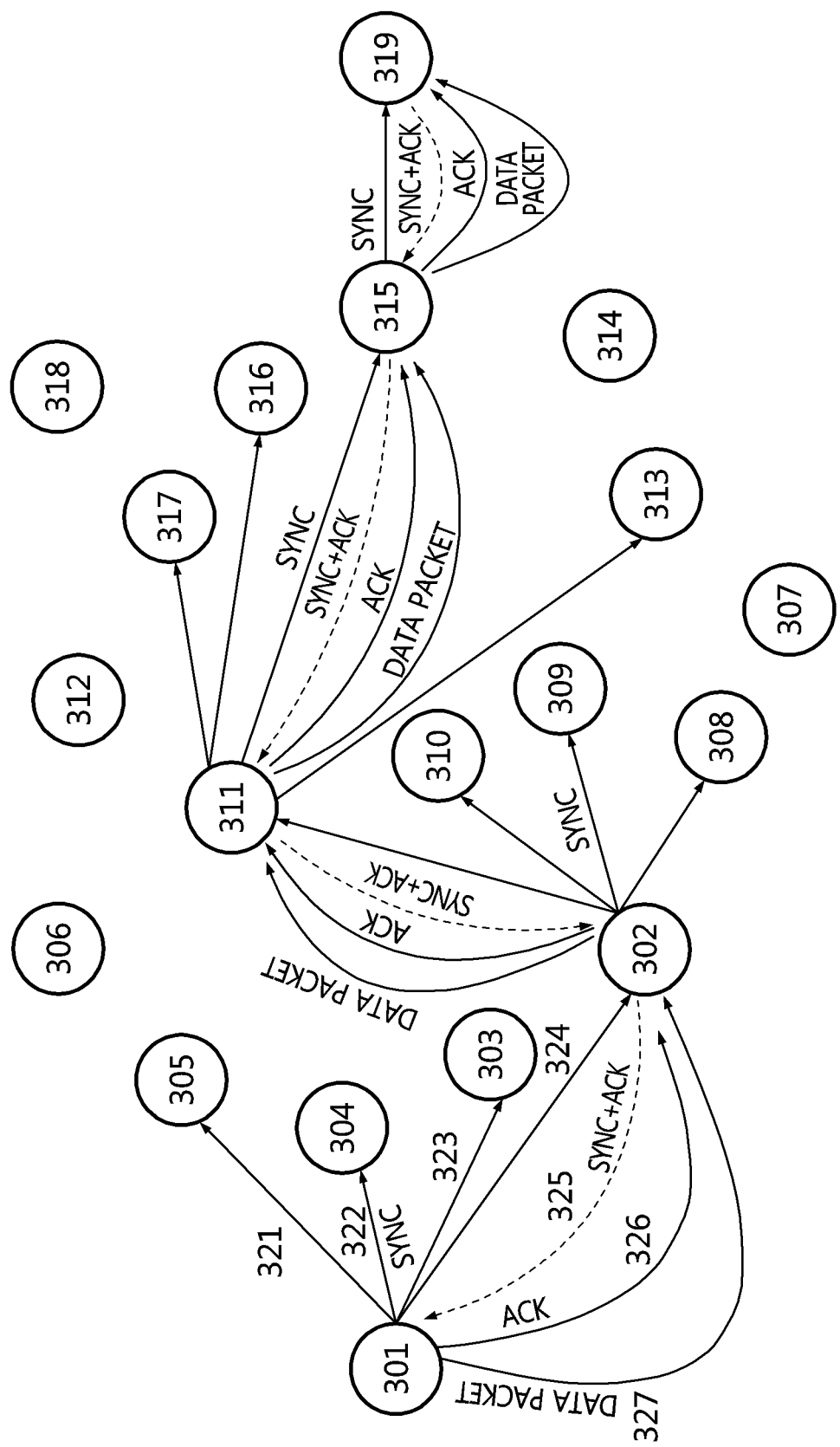
FIG. 3 is a view that shows an example of the process of setting a network routing path according to an embodiment of the present invention.

FIG. 3 is a view that shows an example of the process of setting a network routing path according to an embodiment of the present invention.

Referring to FIG. 3, the system 100 for supporting setting of a network routing path according to an embodiment of the present invention includes 19 nodes or apparatuses 301 to 319, including the source apparatus 301, which transmits data, and the destination apparatus 319, which receives the data.

First, the source apparatus 301 simultaneously transmits a SYNC message to apparatuses included in its sub-cast list or intermediate apparatuses 302, 303, 304 and 305 through network links 321, 322, 323 and 324 in order to establish a network session. This may be performed through a sub-casting mechanism based on the Internet protocol. Then, the source apparatus 301 waits for a SYNC+ACK message from the intermediate apparatuses 302, 303, 304 and 305. When the intermediate apparatus 302 is the first apparatus that responds with a SYNC+ACK message (325), the source apparatus 301 establishes a network session with the intermediate apparatus 302 by transmitting an ACK message thereto (326), and transmits data to the intermediate apparatus 302 (327). The source apparatus 301 may ignore SYNC+ACK messages received from the remaining apparatuses 303, 304 and 305, or may transmit a NACK messages in response to the SYNC+ACK messages therefrom.

Here, because the intermediate apparatus 302 is the apparatus that responded with the SYNC+ACK message first, the network link 324 between the source apparatus 301 and the intermediate apparatus 302 may be regarded as having a higher CIR than the remaining network links 321, 322 and 323, and the intermediate apparatus 302 may be regarded as having a lower load than the remaining intermediate apparatuses 303, 304 and 305.

Similarly, the intermediate apparatus 302 simultaneously transmits a SYNC message to intermediate apparatuses 308, 309, 310 and 311 included in its sub-cast list, and transmits an ACK message to the intermediate apparatus 311, which responds to the SYNC message first, thereby establishing a network session therewith and transmitting the data, received from the source apparatus 301, to the intermediate apparatus 311.

Similarly, the intermediate apparatus 311 simultaneously transmits a SYNC message to intermediate apparatuses 313, 315, 316 and 317 included in its sub-cast list, and transmits an ACK message to the intermediate apparatus 315, which responds to the SYNC message first, thereby establishing a network session therewith and transmitting the received data to the intermediate apparatus 315.

Then, because the sub-cast list of the intermediate apparatus 315 includes the destination apparatus 319, the intermediate apparatus 315 transmits a SYNC message to the destination apparatus 319, receives a SYNC+ACK message therefrom, and transmits an ACK message thereto, thereby establishing a network session with the destination apparatus 319 and transmitting the received data thereto.

That is, as illustrated in FIG. 3, a source apparatus establishes a network session with the intermediate apparatus that responds to a SYNC message first, among apparatuses included in the sub-cast list of the source apparatus, and the process of establishing a network session from the intermediate apparatus to the first responding intermediate apparatus, among apparatuses included in the sub-cast list, is repeated until a network session with the destination apparatus is established, whereby a network routing path from the source apparatus to the destination apparatus may be set.

Accordingly, when the network routing path from the source apparatus 301 to the destination apparatus 319 is set, the path includes the intermediate apparatuses 302, 311 and 315, which respond to a SYNC message first, whereby the routing path may be optimized and the time during which data is queued in the intermediate apparatuses may be reduced.

Figure 4:
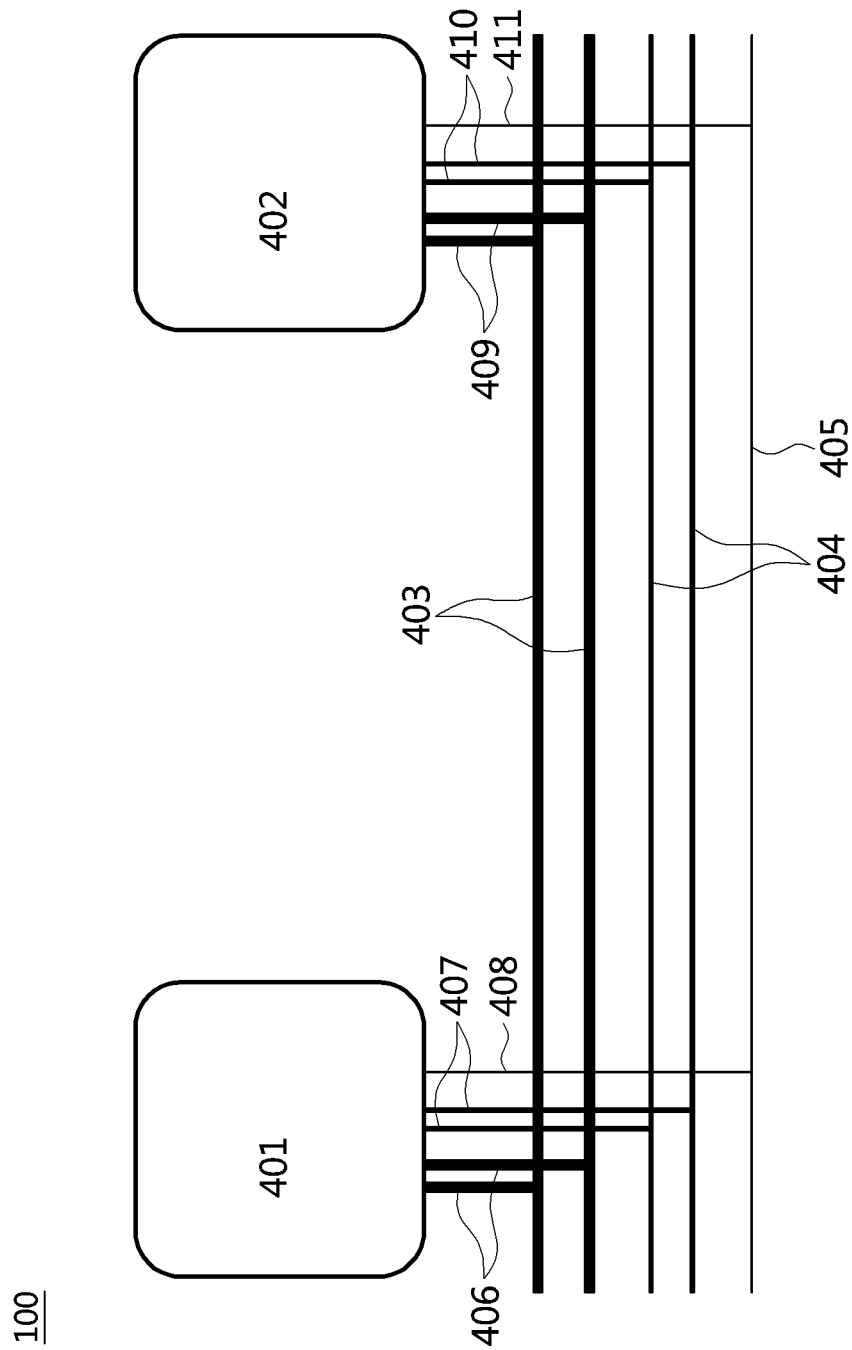
FIG. 4 is a view that shows an example of network segmentation according to an embodiment of the present invention.

FIG. 4 is a view that shows an example of network segmentation according to an embodiment of the present invention.

Referring to FIG. 4, the system 100 for supporting setting of a network routing path according to an embodiment of the present invention includes apparatuses 401 and 402 between which a network session is established. Also, the network session between the apparatus 401 and the apparatus 402 is configured with multiple networks 403, 404 and 405 through multiple network adapters 406 to 411.

For example, data that is sensitive to transmission time may be transmitted over the high-speed backbone network 403 using the high-speed adapters 406 and 409, system management notification or a large amount of data may be transmitted over the medium-speed network 404 using the medium-speed adapters 407 and 410, and administrative data may be transmitted over the low-speed network 405 using the low-speed adapters 408 and 411. In another example, a large amount of time-sensitive data may be transmitted over the high-speed network 403, and a large amount of batch data may be transmitted over the medium-speed network 404.

Here, redundancy between the high-speed network 403 and the medium-speed network 404 may be provided for load balancing or failover backup. That is, in the event of the overload of the high-speed network 403 or in the event of a failure in the high-speed network 403, the medium-speed network 404 may be used to transmit all or some of the data to be transmitted over the high-speed network 403 by replicating the data therefrom.

Figure 5:
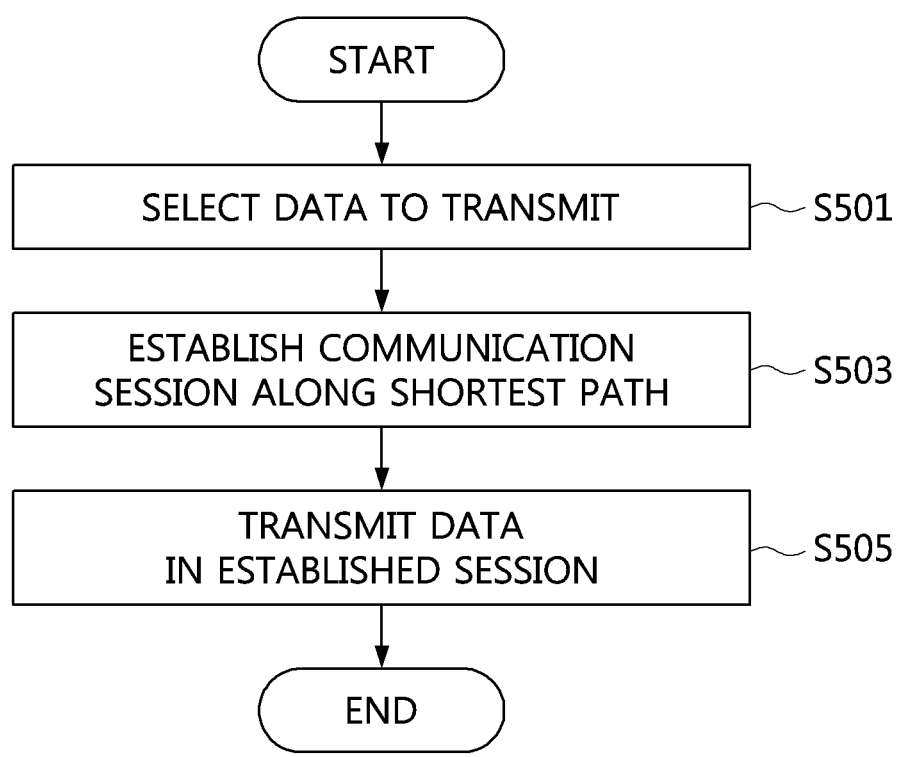
FIG. 5 is a flowchart that shows a method for supporting setting of a network routing path according to an embodiment of the present invention.

FIG. 5 is a flowchart that shows a method for supporting setting of a network routing path according to an embodiment of the present invention.

Referring to FIG. 5, in the method for supporting setting of a network routing path according to an embodiment of the present invention, an apparatus (110 in FIG. 1) for supporting setting of a network routing path sets data to transmit at step S501. That is, if the current apparatus (110 in FIG. 1) for supporting setting of a network routing path is a source apparatus, it selects data to transmit from data stored therein, but if the current apparatus (110 in FIG. 1) for supporting setting of a network routing path is an intermediate apparatus, data received from another intermediate apparatus or a source apparatus may be the data to transmit.

Also, in the method for supporting setting of a network routing path according to an embodiment of the present invention, the apparatus (110 in FIG. 1) for supporting setting of a network routing path establishes a communication session along the shortest path at step S503. Here, the shortest path may be a network routing path including network sessions that may minimize transmission time.

Also, in the method for supporting setting of a network routing path according to an embodiment of the present invention, the apparatus (110 in FIG. 1) for supporting setting of a network routing path transmits data in the established network session at step S505.

Figure 6:
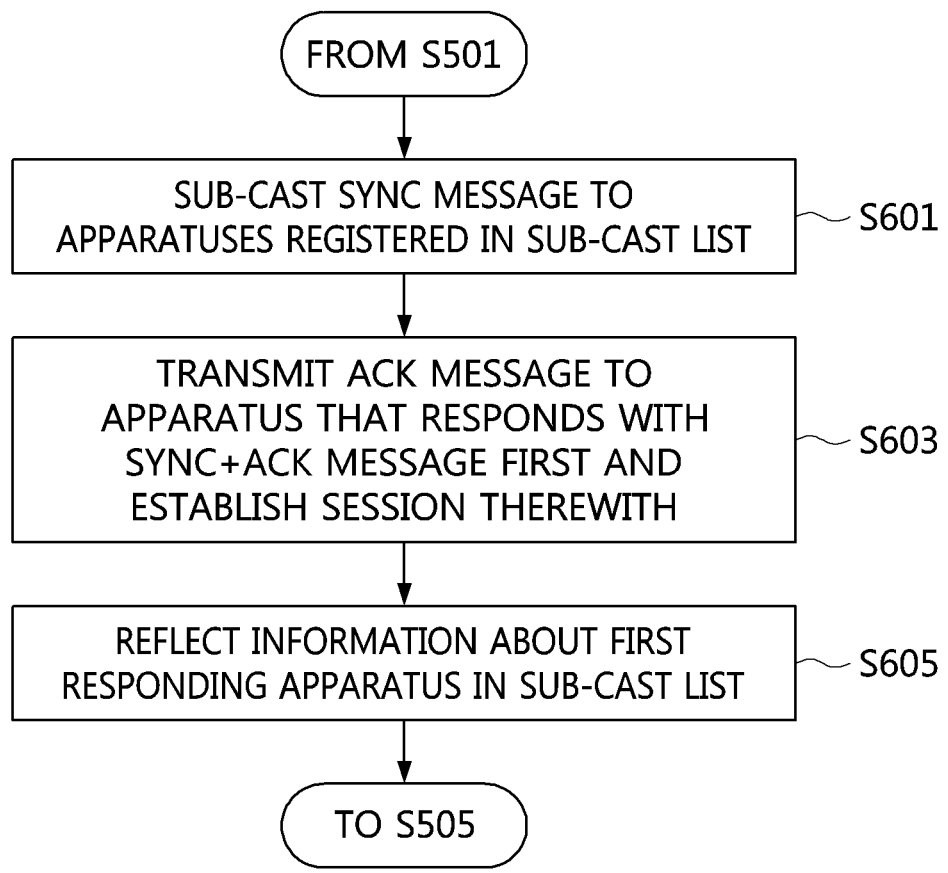
FIG. 6 is a flowchart that shows an example of the step of establishing a communication session using the shortest path, illustrated in FIG. 5.

FIG. 6 is a flowchart that shows an example of the step (S503) of establishing a communication session along the shortest path, illustrated in FIG. 5.

Referring to FIG. 6, in the step (S503) of establishing a communication session along the shortest path, illustrated in FIG. 5, the apparatus (110 in FIG. 1) for supporting setting of a network routing path sub-casts a SYNC message to apparatuses included in a sub-cast list at step S601. Here, sub-casting is simultaneous transmission of a SYNC message to apparatuses included in a sub-cast list, and is advantageous in that a session may be established faster than when unicasting, through which a SYNC message is transmitted to one apparatus at a time, is used.

Here, the SYNC message may be transmitted to all of the apparatuses included in the sub-cast list, but may be transmitted only to apparatuses of which the score or priority satisfies preset conditions, among the apparatuses included in the sub-cast list.

Also, in the step (S503) of establishing a communication session along the shortest path illustrated in FIG. 5, the apparatus (110 in FIG. 1) for supporting setting of a network routing path transmits an ACK message to the apparatus that responds with a SYNC+ACK message first, and establishes a network session therewith at step S603.

Also, in the step (S503) of establishing a communication session along the shortest path illustrated in FIG. 5, the apparatus (110 in FIG. 1) for supporting setting of a network routing path reflects information about the first responding apparatus in the sub-cast list at step S605. For example, the apparatus (110 in FIG. 1) for supporting setting of a network routing path may raise the grade or priority of the first responding apparatus.

Here, not only information about the first responding apparatus but also information about the remaining apparatuses may be reflected in the sub-cast list in consideration of the responses therefrom. For example, the faster the response from a certain apparatus, the higher the grade or priority of the corresponding apparatus.

Figure 7:
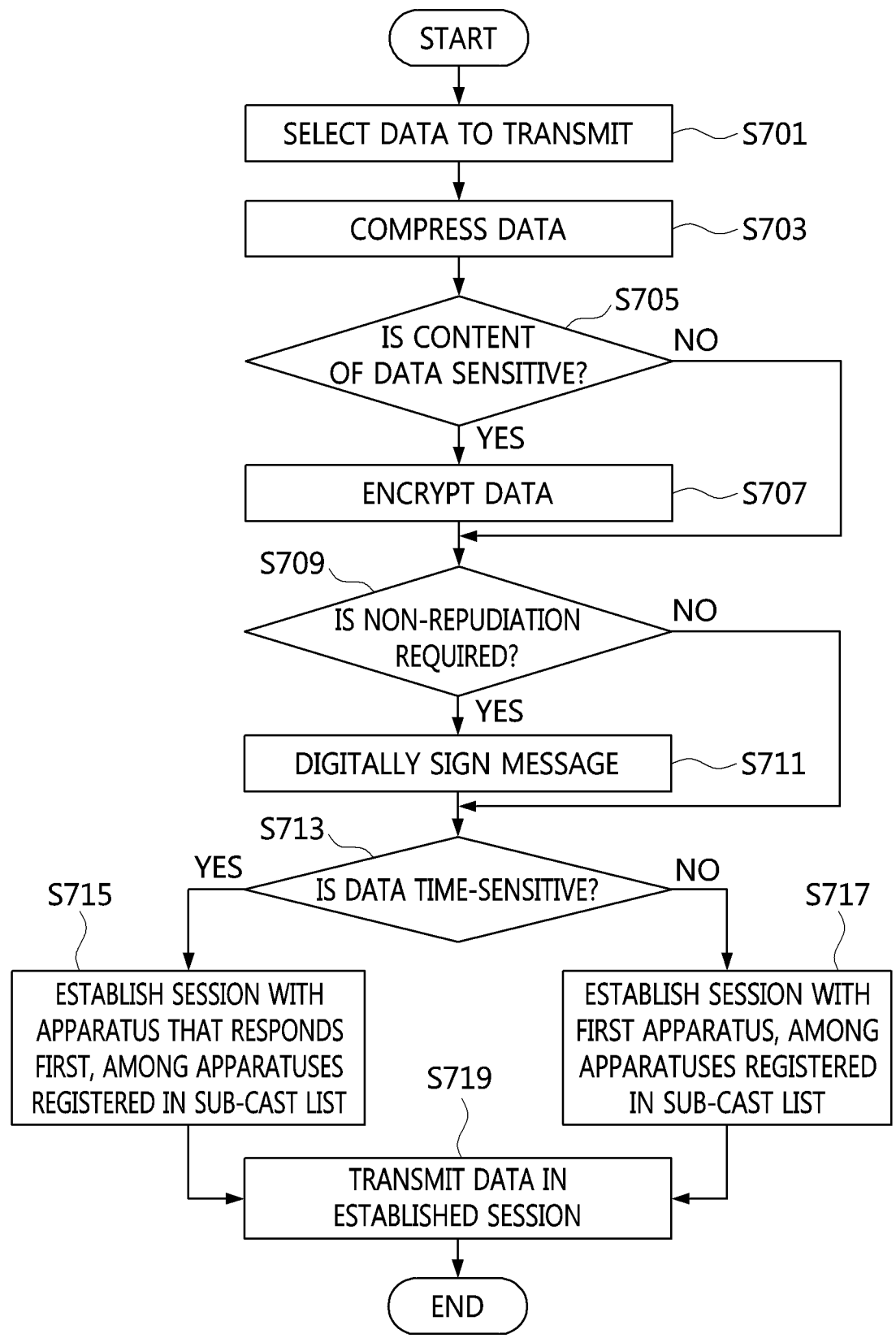
FIG. 7 is a flowchart that shows a method for supporting setting of a network routing path according to an embodiment of the present invention.

FIG. 7 is a flowchart that shows a method for supporting setting of a network routing path according to an embodiment of the present invention.

Referring to FIG. 7, in the method for supporting setting of a network routing path according to an embodiment of the present invention, an apparatus (110 in FIG. 1) for supporting setting of a network routing path selects data to transmit at step S701.

Also, in the method for supporting setting of a network routing path according to an embodiment of the present invention, the apparatus (110 in FIG. 1) for supporting setting of a network routing path selects a compression method depending on the content of the data to transmit and compresses the data using the compression method at step S703.

Here, when the content of the data is a sound source, a picture, or video, lossy compression may be performed, but when the data is text or numeric data, lossless compression may be performed.

Also, in the method for supporting setting of a network routing path according to an embodiment of the present invention, the apparatus (110 in FIG. 1) for supporting setting of a network routing path determines at step S705 whether the data to transmit is sensitive data for which security is required, and encrypts the data at step S707 when the data is determined to be sensitive data.

Also, in the method for supporting setting of a network routing path according to an embodiment of the present invention, the apparatus (110 in FIG. 1) for supporting setting of a network routing path determines at step S709 whether non-repudiation is necessary for the data to transmit, and digitally signs the data at step S711 when it is determined that non-repudiation is necessary for the data to transmit.

Also, in the method for supporting setting of a network routing path according to an embodiment of the present invention, the apparatus (110 in FIG. 1) for supporting setting of a network routing path determines at step S713 whether the data (or the message) to transmit is time-sensitive.

When it is determined at step S713 that the data to transmit is time-sensitive, the apparatus (110 in FIG. 1) for supporting setting of a network routing path transmits a SYNC message to all of apparatuses registered in a sub-cast list, establishes a network session with the apparatus that responds to the SYNC message first at step S715, and transmits data in the established network session at step S719.

When it is determined at step S713 that the data to transmit is not time-sensitive, the apparatus (110 in FIG. 1) for supporting setting of a network routing path transmits a SYNC message to a first apparatus, among the apparatuses registered in the sub-cast list, establishes a network session therewith at step S717, and transmits data in the established network session at step S719. Here, the first apparatus may be the apparatus having the highest score or priority, among the apparatuses registered in the sub-cast list.

In an alternative embodiment, among the above steps S701, S703, S705, S707, S709, S711, S713, S715, S717 and S719, compressing data at step S703, encrypting data at steps S705 and S707, and digitally signing data at steps S709 and S711 may be performed in parallel.

In an alternative embodiment, among the above steps S701, S703, S705, S707, S709, S711, S713, S715, S717 and S719, compressing data at step S703, encrypting data at steps S705 and S707, and digitally signing data at steps S709 and S711 may be performed in a different order.

According to the present invention, through the apparatus and method for supporting setting of a network routing path, a network routing path through which the time taken to transmit data may be minimized may be set by simultaneously transmitting a SYNC message to intermediate systems and by considering the load of the intermediate systems and the network load between the intermediate systems.

Also, according to the present invention, through the apparatus and method for supporting setting of a network routing path, a sub-cast list is dynamically managed in consideration of responses from neighboring apparatuses, whereby a network routing path optimized for a given situation may be set.

Also, according to the present invention, through the apparatus and method for supporting setting of a network routing path, the data to be transmitted may be distributed across multiple networks that form a network session in consideration of the characteristics of the data, whereby the urgency or priority of data may be reflected, and the load imposed by data transmission may be effectively distributed.

Although specific embodiments have been described in the specification, they are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. An apparatus for supporting setting of a network routing path, comprising:
   a memory; and
   one or more hardware processors to execute an operation including:
   dynamically managing a sub-cast list, including one or more other apparatuses for supporting setting of a network routing path with which a network session is to be established and information about the apparatuses;
   simultaneously transmitting a SYNC message to the apparatuses included in the sub-cast list and establishing a network session with one of the apparatuses included in the sub-cast list in consideration of responses to the SYNC message; and
   transmitting data in the established network session.

2. The apparatus of claim 1, wherein managing the sub-cast list comprises dynamically managing the sub-cast list by reflecting the responses to the SYNC message.

3. The apparatus of claim 2, wherein managing the sub-cast list comprises raising a score or priority of the apparatus included in the sub-cast list when the response by the apparatus to the SYNC message is faster.

4. The apparatus of claim 3, wherein:
   the sub-cast list includes a time factor or a place factor for each of the apparatuses included in the sub-cast list; and
   transmitting the SYNC message comprises calculating a temporary score or temporary priority to which the time factor or the place factor, corresponding to a situation in which the SYNC message is transmitted, is reflected, and selecting apparatuses to which the SYNC message is to be transmitted depending on the temporary score or the temporary priority.

5. The apparatus of claim 4, wherein managing the sub-cast list comprises adjusting the time factor or the place factor in consideration of the responses to the SYNC message and the situation in which the SYNC message is transmitted.

6. The apparatus of claim 5, wherein the operation further comprising:
   determining a transmission mode for the data in consideration of characteristics of the data,
   wherein, when the transmission mode is a time-sensitive transmission mode, transmitting the SYNC message comprises simultaneously transmitting the SYNC message to all of the apparatuses included in the sub-cast list and establishing a network session with an apparatus that responds to the SYNC message first.

7. The apparatus of claim 6, wherein, when the transmission mode is not a time-sensitive transmission mode, transmitting the SYNC message comprises establishing a network session with a first apparatus, among the apparatuses included in the sub-cast list.

8. The apparatus of claim 7, wherein the first apparatus is an apparatus having a highest score or highest priority in a current situation, among the apparatuses included in the sub-cast list.

9. The apparatus of claim 8, wherein, when the network session is connected through multiple networks, unit transmitting the data comprises distributing the data across the multiple networks or transmitting the data over a network selected from among the multiple networks in consideration of at least one of time-sensitivity of the data, a size thereof, and an importance thereof.

10. The apparatus of claim 9, wherein the operation further comprises:
    performing at least one of compression of the data, encryption of the data, and digital signing of the data.

11. A method for supporting setting of a network routing path, comprising:
    dynamically managing a sub-cast list, which includes one or more apparatuses for supporting setting of a network routing path with which a network session is to be established and information about the apparatuses;
    simultaneously transmitting a SYNC message to the apparatuses included in the sub-cast list;
    establishing a network session with one of the apparatuses included in the sub-cast list in consideration of responses to the SYNC message; and
    transmitting data in the established network session.

12. The method of claim 11, wherein managing the sub-cast list is configured to dynamically manage the sub-cast list by reflecting the responses to the SYNC message.

13. The method of claim 12, wherein managing the sub-cast list is configured to raise a score or priority of the apparatus included in the sub-cast list when the response by the apparatus to the SYNC message is faster.

14. The method of claim 13, wherein:
    the sub-cast list includes a time factor or a place factor for each of the apparatuses included in the sub-cast list; and
    transmitting the SYNC message is configured to calculate a temporary score or temporary priority to which the time factor or the place factor, corresponding to a situation in which the SYNC message is transmitted, is reflected and to select apparatuses to which the SYNC message is to be transmitted depending on the temporary score or the temporary priority.

15. The method of claim 14, wherein managing the sub-cast list is configured to adjust the time factor or the place factor in consideration of the responses to the SYNC message and the situation in which the SYNC message is transmitted.

16. The method of claim 15, further comprising:
determining a transmission mode for the data in consideration of characteristics of the data,
wherein establishing the network session is configured such that, when the transmission mode is a time-sensitive transmission mode, the SYNC message is simultaneously transmitted to all of the apparatuses included in the sub-cast list and the network session is established with an apparatus that responds to the SYNC message first.

17. The method of claim 16, wherein establishing the network session is configured to establish the network session with a first apparatus, among the apparatuses included in the sub-cast list, when the transmission mode is not a time-sensitive transmission mode.

18. The method of claim 17, wherein the first apparatus is an apparatus having a highest score or highest priority in a current situation, among the apparatuses included in the sub-cast list.

19. The method of claim 18, wherein transmitting the data is configured such that, when the network session is connected through multiple networks, the data is distributed across the multiple networks or the data is transmitted over a network selected from among the multiple networks in consideration of at least one of time-sensitivity of the data, a size thereof, and an importance thereof.

20. The method of claim 19, further comprising:
performing at least one of compression of the data, encryption of the data, and digital signing of the data.

* * * * *